United States Patent Office 2,994,679
Patented Aug. 1, 1961

2,994,679
POLYSTYRENE COMPOSITION PLASTICIZED WITH PYROLYZED POLYETHYLENE AND METHOD OF PREPARATION
Rufus V. Jones and Peter J. Canterino, Bartlesville, Okla., assignors to Phillips Petroleum Company, a corporation of Delaware
No Drawing. Original application Jan. 3, 1955, Ser. No. 479,681. Divided and this application Sept. 30, 1957, Ser. No. 686,843
11 Claims. (Cl. 260—33.6)

This invention relates to a novel hydrocarbon material. In one aspect, this invention relates to a process of pyrolysis. In another aspect, it relates to a plasticized polystyrene composition and a method of preparing the same.

This application is a division of our copending application Serial No. 479,681, filed January 3, 1955.

It is known in the prior art to pyrolyze certain polyethylenes to obtain products of lower molecular weight. The present invention provides a method for the production of novel pyrolysis products by utilizing, as a feed to the pyrolysis process, an olefin polymer prepared as subsequently described.

Polystyrenes and the production thereof are well known in the art. The properties of a particular polystyrene resin are to some extent dependent upon the method of preparation thereof. Certain polystyrene resins are quite brittle at low temperatures whereas some are relatively tough and not brittle. As a general rule, however, the polystyrenes are difficult to mold, particularly when it is desired to prepare large molded articles. Numerous different materials have been proposed as plasticizers for polystyrene resins, but, in many cases, satisfactory results have not been obtained. In some cases, it is necessary to add relatively large amounts of plasticizers in order to obtain the desired plasticity. In other cases, the addition of plasticizers yields tacky compositions having low tensile strength. In many cases, the plasticizers are not compatible with the polystyrene and it is, therefore, impossible to produce clear, transparent, molded products therefrom.

This invention provides a novel material utilizable as a polystyrene plasticizer, a novel plasticized polystyrene resin composition and a method of production thereof.

According to this invention, novel pyrolysis products are obtained by pyrolyzing, or thermally decomposing, or cracking, a high molecular weight polymer, especially a polymer of at least one 1-olefin having a maximum chain length of 8 carbon atoms and no branching nearer the double bond than the 4-position, said polymer having been produced by polymerization in the presence of a composite catalyst which comprises chromium oxide as an essential ingredient.

The pyrolysis according to this invention is carried out at a temperature in the range 600 to 1200° F.

The polymeric material which is subjected to pyrolysis according to this invention is prepared according to methods more fully set forth in the copending application of Hogan and Banks, Serial No. 476,306, filed December 20, 1954, and now abandoned, a continuation-in-part of which is now U.S. 2,825,721. In brief, this method comprises contacing an olefin, such as ethylene, propylene, 1-butene, 1-pentene and/or 1-hexene, at a temperature in the range 150 to 450° F. with a catalyst comprising, as its essential ingredients, from 0.1 to 10 or more weight percent chromium in the form of chromium oxide, including a substantial proportion of hexavalent chromium, associated with at least one additional oxide, especially at least one oxide selected from the group consisting of silica, alumina, zirconia, and thoria. This catalyst, in one of its preferred forms, is a highly oxidized catalyst which has been activated by high-temperature treatment with an oxidizing gas. The polymerization is usually carried out with the monomeric olefin in solution in a hydrocarbon solvent, especially a paraffin or a naphthene which is liquid under the polymerization conditions. The polymers decomposed by pyrolysis according to the present invention have a molecular weight of at least 5,000, and the molecular weight can be as high as 200,000 or more.

The pyrolysis products according to this invention have numerous uses, such as starting materials for alkylation processes wherein aromatics are alkylated with the said products to produce lubricating oil additives and/or intermediates for the production of surface-active materials. The pyrolysis products are particularly valuable as plasticizers.

Further according to this invention, a polystyrene resin composition having improved molding properties is obtained by blending with a polystyrene resin produced by any of the methods known in the prior art, a minor proportion, sufficient to plasticize said polystyrene, of a pyrolysis product prepared as previously described herein.

Hydrocarbon compositions, according to this invention, having molecular weights in the range 200 to 800 which are linear in character, contain terminal vinyl groups, terminl methyl groups, and trans-internal unsaturation, are obtained by heating specially prepared solid polyethylenes at a temperature in the range 700 to 900° F. and distilling. It is generally preferred that the thermal treatment be effected in the absence of air. The solid polyethylene employed as the starting material is prepared by the polymerization of ethylene at relatively low pressures over a composite chromium oxide polymerization catalyst, as more fully described in the cited application of Hogan and Banks.

In the preparation of the pyrolysis products of this invention, the products can be distilled simultaneously with the thermal treatment. When operating in this manner, the overhead temperature for the distillation is in the range between 400 and 600° F., and pressures not exceeding about 100 mm. Hg are employed. Said pressures preferably do not exceed 25 mm. Hg, and, still more preferably, they do not exceed 15 mm. Hg. If desired, the polyethylene can be subjected to the thermal treatment (pyrolysis) at atmospheric pressure and pyrolysis temperature, as indicated above, generally using an inert gas blanket, such as nitrogen, and the pressure can then be reduced prior to distillation.

The olefinic compositions prepared in the manner described, according to this invention, are slightly yellow, waxy solids which have average molecular weights in the range between 200 and 800. They differ from products prepared in a similar manner from other polyethylenes. The products of this invention have linear carbon chains, i.e., they have very little, if any, branching. On the other hand, products prepared from other polyethylenes appear to contain considerable branching. The double bonds present in the products of this invention are present as terminal vinyl groups and as trans-internal double bonds with very few, if any, "branched vinyl" groups being present. On the other hand, products obtained by the thermal treatment of other polyethylenes contain smaller amounts of terminal vinyl groups and trans-internal double bonds but, in addition, contain so-called "branched vinyl" groups in considerable percentage. Infra-red spectroscopic study indicates that pyrolysis products obtained from certain commercial polyethylenes contain a larger number of methyl substituents than are present in the compositions of this invention. The methyl groups which can be detected by infra-red spectroscopy include those connected to internal carbon atoms of long chains, as well as terminal methyl groups on the longer carbon chains.

Terminal vinyl groups and trans-internal unsaturation may be represented in the following manner:

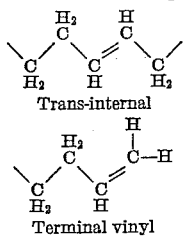

Trans-internal

Terminal vinyl

"Branched vinyl" groups may be represented in the following manner:

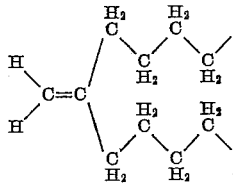

The olefinic compositions of this invention can be blended with various resinous materials to modify the properties of the latter. One important use is in blends with polystyrene to give compositions having improved molding characteristics, as compared with polystyrene alone.

It has been found that, by blending a minor amount of the pyrolysis product of this invention with polystyrene, clear molding compositions are readily obtained which have a much higher melt index than polystyrene alone and, therefore, have improved flowing properties during molding operations, as compared with polystyrene alone. (Melt index, as determined by ASTM Method D1238–52T, is the rate of extrusion of a thermoplastic material through an orifice of a specified length and diameter, under prescribed conditions of temperature and pressure.) The other physical properties of the new polystyrene molding compositions, according to this invention, including impact resistance and tensile strength, are also very satisfactory. The amount of pyrolysis product employed is, generally, in the range 0.2 to 20, preferably 0.5 to 8, weight percent, based on the polystyrene. When the composition contains less than about 8 weight percent of the pyrolysis product, said composition is clear and transparent.

The polystyrenes with which this invention is concerned are the moldable homopolymers of styrene which are known in the art. The polystyrene and the pyrolysis product can be blended in a mixer of any kind, or an extruder can be employed for mixing. The materials are frequently blended on a roll mill. Regardless of the method, the mixing is done at an elevated temperature. The polystyrene should be at a temperature high enough that it can be milled. The temperature will depend upon the polystyrene employed and is ordinarily in the range 150 to 325° F.

The molding compositions of this invention are applicable for the many uses already known for polystyrene. On account of their excellent molding characteristics, they are particularly applicable for making large molded objects, since the material can be caused to flow smoothly into corners and over large areas. These compositions can be shaped by compression or injection molding to yield smooth, lustrous objects.

*Example I*

Ethylene was polymerized over a fixed bed of chromium oxide-silca-alumina catalyst, containing 2.48 weight percent chromium as chromium oxide, at 320° F., 450 p.s.i.g., and a space velocity (volumes liquid/volume catalyst/hour) of 5, the feed containing 2.5 weight percent ethylene in isooctane (2,2,4-trimethylpentane). The ethylene feed rate was 2.24 pounds per hour. The polyethylene obtained had a density of 0.956 at 20° C., a melting point of 243° F., and a molecular weight of 11,080, as determined by intrinsic viscosity measurement utilizing a solution of the polymer in tetralin.

Six hundred eighty grams of polyethylene prepared as described above was charged to a stainless steel pot, 1 percent by weight 2,6-di-tert-butyl-4-methylphenol (Ionol) was added in order to inhibit any possible oxidation, the pot was flushed with nitrogen, evacuated to a pressure of 1 mm. Hg and heated gradually to 730° F. over a period of 5 hours. The pot temperature was maintained at 730 to 750° F. for about 3 to 4 hours, during which the pyrolysis product was continuously distilled off at an overhead temperature of 520 to 570° F. The pressure during the distillation was 7 to 8 mm. Hg. The product taken overhead weighed 327 grams and had a molecular weight (determined by benzene boiling point elevation) of 327. It was a slightly yellow, waxy solid. This material is hereinafter designated as product A.

Four hundred forty-four grams of a commercial polyethylene not produced by use of a chromium oxide catalyst and having a molecular weight of approximately 12,000 was charged to a stainless steel pot, 1 percent by weight 2,6-di-tert-butyl-4-methylphenol was added, the pot was flushed with nitrogen, evacuated to a pressure of 1 mm. Hg, and heated gradually, over a period of 1½ hours, to 725° F. At this point, the material began to distil. During the distillation, which was continued for 4 to 5 hours, the pot temperature remained at 725° F. and the overhead temperature was 478 to 480° F. The pressure during distillation was 7 to 8 mm. Hg. The product was a wax-like material having a molecular weight of 346. This material is hereinafter designated as product B. The yield was lower than that of product A, a larger amount of gaseous pyrolysis product being formed.

Infrared analyses were run on the two products A and B. The following results were obtained:

| | Product A | Product B |
|---|---|---|
| Temperature, ° C. | 85 | 86 |
| Film thickness, microns | 76 | 74 |
| Isolated CH$_3$ groups per 100 carbon atoms | 7.0 | 8.4 |
| Unsaturation: | | |
| Percent trans | 17 | 14 |
| Percent terminal vinyl | 83 | 66 |
| Percent branch | | 20 |
| Density at 30.5° C. | 0.825 | 0.821 |
| Double bonds per molecule | 0.5 | 0.4 |

Infrared data were compared in the following manner against the molecular weight values obtained by boiling point elevation for each of the materials:

| | Product A | Product B |
|---|---|---|
| Molecular weight by benzene boiling point elevation | 327 | 346 |
| Number of carbon atoms per molecule: | | |
| 327/14 [1] | 23.3 | |
| 346/14 [1] | | 24.7 |
| Number of double bonds per 100 carbon atoms: | | |
| (0.5) (100)/23.3 | 2.14 | |
| (0.4) (100)/24.7 | | 1.62 |
| Terminal vinyl groups per 100 carbon atoms: | | |
| (2.14) (0.83) | 1.78 | |
| (1.62) (0.66) | | 1.07 |
| Total end groups (methyl and vinyl) per 100 carbon atoms: | | |
| 7.0+1.78 | 8.78 | |
| 8.4+1.07 | | 9.47 |
| Molecules per 100 carbon atoms (assuming each molecule to have only two end groups): | | |
| 8.78/2 | 4.39 | |
| 9.47/2 | | 4.73 |
| Number of carbon atoms per molecule: | | |
| 100/4.39 | 22.8 | |
| 100/4.73 | | 21.1 |
| Molecular weight calculated from infrared analysis: | | |
| (22.8) (14) | 319.2 | |
| (21.1) (14) | | 295.4 |

[1] The weight of a CH$_2$ group is 14.

The last-mentioned molecular weight of product A, calculated from boiling point elevation together with the results of the infrared analysis, is in reasonably close agreement with that obtained experimentally by the boiling point elevation method. For product B, the difference is quite large. It is believed that branching in product B accounts for the difference in molecular weight as calculated from infrared analysis from that determined by boiling point elevation. These results at least indicate that there is a fundamental difference between product A and product B, since the foregoing assumption that product A has only two end groups (and is, therefore, linear) is much more nearly correct than the same assumption for product B.

*Example II*

Ethylene was polymerized over a fixed bed of chromium oxide-silica-alumina catalyst, containing 2.46 weight percent chromium as chromium oxide, at 310 to 330° F., 400 p.s.i.g., and a space velocity (volumes liquid/volume catalyst/hour) of 5, the feed containing 2 weight percent ethylene in isooctane. The ethylene feed rate was 1.80 pounds per hour. The polyethylene obtained had a density of 0.956 at 20° C., a melting point of 242±1° F., and a molecular weight of 11,650, as determined by intrinsic viscosity measurement utilizing a solution of the polymer in tetralin.

Five hundred grams of the polyethylene, prepared as described above, was charged to a 2-liter pot which was then flushed with nitrogen, evacuated to a pressure of 1 mm. Hg and heated gradually to 800° F. The pot temperature was maintained at 800° F. and the overhead temperature at 500 to 550° F. The pressure during the distillation was 4 mm. Hg. The product taken overhead weighed 320 grams and had a molecular weight (determined by benzene boiling point elevation) of 335. It was a slightly yellow, waxy solid. This material is hereinafter designated as product C.

Crystallinity was determined by X-ray diffraction on the pyrolysis product (product C) and on a sample of the pyrolysis product described in Example I (product B). Product C showed much greater crystallinity than product B. Data obtained were as follows:

| | Percent crystallinity |
|---|---|
| Product C | 15 |
| Product B | 7 |

Five weight percent of product C was blended on a hot mill (300° F.) with a general-purpose polystyrene. A homogeneous blend which remained clear was obtained, indicating that the polystyrene and product C were compatible.

When an attempt was made to incorporate a sample of the original, unpyrolyzed, polyethylene into the same polystyrene, the mixture became cloudy upon the addition of the first small portion of polyethylene and when one weight percent had been added, the mixture was white. There was no indication that the two materials were compatible.

*Example III*

Portions of product C (Example II) were blended on a hot mill (300° F.) with the previously mentioned general-purpose polystyrene. Three runs were made using 5, 10 and 15 weight percent of the polyethylene pyrolysis product, based on the polystyrene. The pyrolysis product formed homogeneous blends with the polystyrene but in the last two runs, some cloudiness appeared in the mixture, which indicated incompatibility of the pyrolysis product with the polystyrene. In the run containing 5 weight percent of pyrolysis product, the product remained clear. Physical properties were determined on the blends and also on the polystyrene by itself. The results were as follows:

| Polyethylene in Blend, Wt. Percent | Impact, ft./lbs./in.[1] | Heat Distortion, ° C. | Tensile, p.s.i. | Elongation, Percent | Melt Index[2] |
|---|---|---|---|---|---|
| 0 | 0.58 | 84 | 6,913 | 2.6 | 0.449 |
| 5 | 0.57 | 76 | 5,847 | 2.25 | 2.410 |
| 10 | 0.45 | 70 | 4,180 | 4.25 | 6.71 |
| 15 | 0.51 | 65 | 2,130 | 19.8 | 7.812 |

[1] ASTM D 256–47 T, cantilever beam test (Izod type).
[2] ASTM D 1238–52 T, rate of extrusion of a thermoplastic material through an orifice of a specified length and diameter under prescribed conditions of temperature and pressure.

The data show that the polystyrene plasticized according to this invention had improved properties, especially increased melt index.

*Example IV*

Product B, obtained by pyrolysis of commercial polyethylene (Example I), was blended on a hot mill (300° F.) with a commercial general-purpose polystyrene. Upon addition of a small quantity of polyethylene pyrolysis product, the mixture was cloudy and when 5 weight percent had been added, the blend was white. The materials were not compatible. The mixture had the following properties:

| | |
|---|---|
| Tensile, p.s.i. | 4930 |
| Elongation, percent | 2 |
| Heat distortion, ° C. | 74.5 |
| Impact, ft. lb./in. | 0.383 |
| Melt index | 1.32 |

From these data, it is clear that the pyrolysis product tested (obtained from polymer produced by process other than polymerization in the presence of a chromium oxide catalyst) was inferior, as a polystyrene additive, to the pyrolysis product of this invention.

*Example V*

Four runs were made to determine whether certain hydrocarbon polymers were compatible with polystyrene. A description of each polymer and results obtained upon blending with polystyrene follow.

(1) A butadiene/vinylcyclohexene copolymer was prepared by the copolymerization of 415 grams of butadiene with one liter of vinylcyclohexene in the presence of 1 liter of n-heptane using 10 grams of sodium dispersed in 100 ml. of n-decane as the catalyst. A liquid polymer was obtained. It was hydrogenated in methylcyclohexane solution in the presence of a nickel-kieselguhr catalyst to give a product having an unsaturation of 6.2 percent. The material had a molecular weight of 878. It was blended on a hot mill (300° F.) with the general purpose polystyrene previously mentioned. Upon addition of a small quantity of the liquid polymer, the mixture became cloudy, indicating that the materials were not compatible. Less than one weight percent of the liquid polymer was incorporated into the polystyrene.

(2) A sample of liquid polybutadiene prepared by sodium-catalyzed polymerization was heated one hour at 10 mm. Hg and a temperature of 200 to 380° F. During this period, there was a vigorous flow of nitrogen though the polymer. The overhead condensate was hydrogenated in methylcyclohexane solution in the presence of a nickel-kieselguhr catalyst. The hydrogenated product had an unsaturation of 15.5 percent and a molecular weight of 232. It was blended on a hot mill (300° F.) with a general purpose polystyrene, as described above. A blend prepared using 5 weight percent of the hydrogenated polymer, based on the polystyrene, was cloudy, indicating incompatibility of the materials.

(3) A sample of liquid polybutadiene prepared by sodium-catalyzed polymerization was hydrogenated to give a product having an unsaturation of 8.7 percent. This product was blended with general purpose polystyrene, as described in (1) above. Less than one weight percent was added to the polystyrene. The materials were incompatible, as evidenced by a cloudiness in the mixture.

(4) A sample of liquid polybutadiene prepared by sodium-catalyzed polymerization was hydrogenated to give a product having an unsaturation of 26 percent. When an attempt was made to prepare a blend of this material with polystyrene, one to two percent of the hydrogenated polymer caused the mixture to form crumbs. The materials were not compatible and a satisfactory blend could not be prepared.

The polymerization catalysts described in the foregoing examples in connection with the preparation of polyethylene were prepared by impregnating a precipitated composite of silica and alumina gels, comprising 90 weight percent silica and 10 weight percent alumina, with an aqueous solution of chromium trioxide and subsequently heating at approximately 950° F. for several hours in a current of substantially anhydrous air.

The foregoing examples demonstrate the utility of the pyrolysis product of this invention as a polystyrene plasticizer and illustrate the superiority of said pyrolysis product, as compared with pyrolysis products of polyethylenes produced by methods other than those described herein, and as compared with certain other hydrocarbon materials.

The molecular weights of the polyethylenes used as starting materials for the pyrolysis process disclosed in the foregoing examples were calculated according to the following formula:

$$M = \frac{4.03 \times 10^3 \times N_i \times 14}{2.303}$$

wherein M is the weight average molecular weight and $N_i$ is the intrinsic viscosity as determined for a solution of 0.2 gram of the polymer in 50 cc. of tetralin at 130° C. This type of molecular weight determination is described by Kemp and Peters, Ind. Eng. Chem. 35, 1108 (1943), and by Dienes and Klemm, J. Applied Phys. 17, 458 (June 1946).

From the foregoing, it will be seen that we have provided a novel pyrolysis product characterized by the substantial absence of branched-vinyl unsaturation; a process for preparing said product by pyrolyzing a polymer prepared by the polymerization of a 1-olefin in the presence of a catalyst containing chromium oxide as an essential ingredient; and a novel plasticized polystyrene resin composition containing a minor, plasticizing amount of said pyrolysis product. Variation and modification within the scope of the disclosure and the claims to the invention can readily be effected by those skilled in the art.

We claim:
1. A composition comprising a polystyrene and a minor proportion, sufficient to plasticize said polystyrene, of a hydrocarbon which is a thermal decomposition product of a polymer of a 1-olefin, said thermal decomposition having been at a temperature in the range of 700 to 900° F., and said polymer having been produced by polymerization of said 1-olefin in the presence of a polymerization catalyst comprising chromium oxide as an essential ingredient, said product having a molecular weight in the range of 200 to 800 and being characterized by a major proportion of the unsaturation being selected from the group consisting of

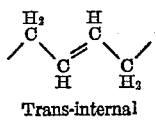
Trans-internal and

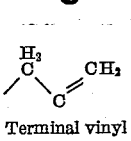
Terminal vinyl unsaturation.

2. A composition comprising a major proportion of a moldable homopolymeric polystyrene and a minor proportion, sufficient to plasticize said polystyrene, of a hydrocarbon material, characterized by a major proportion of the unsaturation being selected from the group consisting of

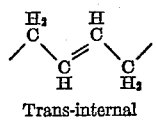
Trans-internal and

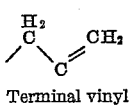
Terminal vinyl unsaturation, and by a molecular weight in the range 200 to 800, said product having been prepared by the thermal decomposition at a temperature in the range 700 to 900° F., and a pressure not substantially greater than 100 mm. Hg, of a polyethylene produced by the polymerization of ethylene in the presence of a polymerization catalyst comprising chromium oxide as an essential ingredient thereof.

3. A composition according to claim 2 wherein said minor proportion is in the range 0.2 to 20 weight percent, based on said polystyrene.

4. A composition according to claim 2 wherein said minor proportion is in the range 0.5 to 8 weight percent, based on said polystyrene.

5. A method which comprises commingling at a temperature in the range 150 to 325° F., a major proportion of a polystyrene and a minor proportion, sufficient to plasticize said polystyrene, of a hydrocarbon product of pyrolysis, at a temperature in the range 700° to 900° F., of a polymer produced by polymerizing a 1-olefin in the presence of a catalyst comprising chromium oxide as an essential ingredient, said product having a molecular weight in the range of 200 to 800 and being characterized by a major proportion of the unsaturation being selected from the group consisting of

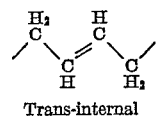
Trans-internal and

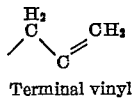
Terminal vinyl unsaturation.

6. A method according to claim 5 wherein said olefin is ethylene, and said pyrolysis is conducted at a pressure not substantially greater than 100 mm. Hg.

7. A solid, plasticized polystyrene having incorporated therein an amount, sufficient to plasticize said polystyrene, of a hydrocarbon product of the pyrolysis of an olefin polymer, said product being characterized by a major proportion of the unsaturation being selected from the group consisting of

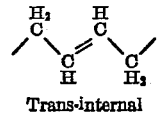
Trans-internal and

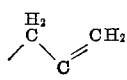
Terminal vinyl unsaturation, and by a molecular weight in the range of about 200 to about 800.

8. A solid plasticized polystyrene composition comprising a major proportion of a solid polystyrene and a minor proportion, sufficient to plasticize said polystyrene, of a solid, waxy hydrocarbon product of the pyrolysis of a normally solid polymer of an olefin, said product having a substantially linear carbon-chain structure and an average molecular weight in the range 200 to 800, the major proportion of the double bonds in said product being present in structures selected from the group consisting of

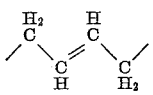
Trans-internal and

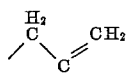
Terminal vinyl unsaturation.

9. A normally solid plasticized polystyrene composition comprising a major proportion of a solid polystyrene and a minor proportion, sufficient to plasticize said polystyrene, of a solid, waxy hydrocarbon product of the pyrolysis of a solid polyethylene, said product having a substantially unbranched carbon-chain structure and an average molecular weight in the range 200 to 800, substantially all of the double bonds in said product being present in structures selected from the group consisting of

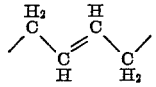
Trans-internal and

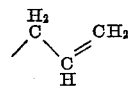
Terminal vinyl unsaturation.

10. A plasticized polystyrene composition comprising a major proportion of a normally solid polystyrene and from 0.2 to 20 weight percent, based on the weight of said polystyrene, of a solid, waxy hydrocarbon product of the pyrolysis of a solid polyethylene, said product having a substantially unbranched carbon-chain structure and an average molecular weight in the range 200 to 800, substantially all of the double bonds in said product being present in structures selected from the group consisting of

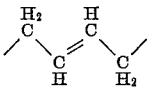
Trans-internal and

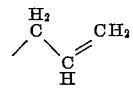
Terminal vinyl unsaturation.

11. A clear, transparent, plasticized polystyrene composition comprising a major proportion of a normally solid polystyrene and from 0.5 to 8 weight percent, based on the weight of said polystyrene of a solid, waxy hydrocarbon product of the pyrolysis of a solid polyethylene, said product having a substantially unbranched carbon-chain structure and an average molecular weight in the range 200 to 800, substantially all of the double bonds in said product being present in structures selected from the group consisting of

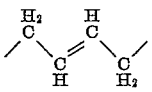
Trans-internal and

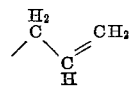
Terminal vinyl unsaturation.

References Cited in the file of this patent

UNITED STATES PATENTS

| | | |
|---|---|---|
| 2,353,228 | Ducca | July 11, 1944 |
| 2,372,001 | Joyce | Mar. 20, 1945 |
| 2,436,842 | Warner et al. | Mar. 2, 1948 |
| 2,691,647 | Field et al. | Oct. 12, 1954 |
| 2,692,257 | Zletz | Oct. 19, 1954 |
| 2,752,315 | Kuettel | June 26, 1956 |
| 2,864,802 | Price et al. | Dec. 16, 1958 |
| 2,868,762 | Oakes | Jan. 13, 1959 |

FOREIGN PATENTS

| | | |
|---|---|---|
| 569,043 | Great Britain | Apr. 19, 1943 |
| 581,279 | Great Britain | Oct. 7, 1946 |
| 127,820 | Australia | May 20, 1948 |

OTHER REFERENCES

Raff et al.: "Polyethylene," High Polymers, volume XI, Interscience Pub. Inc., New York (1956), page 366.

UNITED STATES PATENT OFFICE
CERTIFICATE OF CORRECTION

Patent No. 2,994,679  August 1, 1961

Rufus V. Jones et al.

It is hereby certified that error appears in the above numbered patent requiring correction and that the said Letters Patent should read as corrected below.

Column 8, lines 2 to 5, 20 to 24, and 56 to 58, and column 9, lines 2 to 5, and 25 to 28, the formula, each occurrence, should appear as shown below instead of as in the patent:

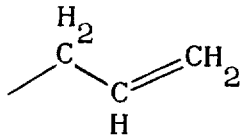

Signed and sealed this 6th day of March 1962.

(SEAL)
Attest:

ERNEST W. SWIDER
Attesting Officer

DAVID L. LADD
Commissioner of Patents